Figure 1:
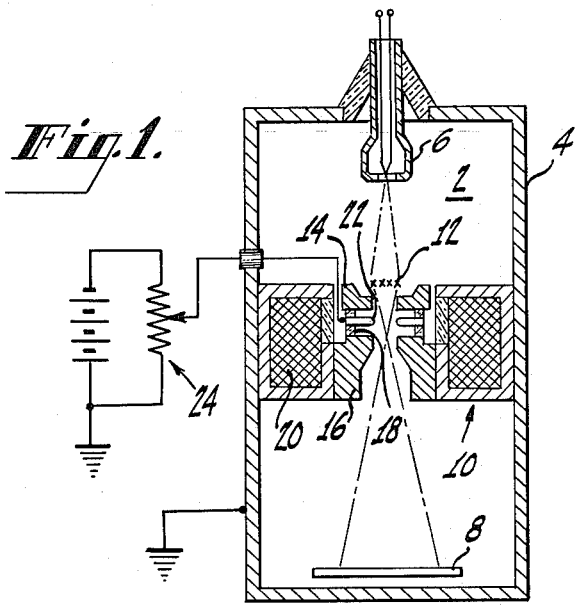

March 21, 1961 — J. H. REISNER — 2,976,457
ELECTRON LENS
Filed Nov. 2, 1953

INVENTOR.
JOHN H. REISNER
BY *Morris A. Rabkin*
ATTORNEY

March 21, 1961 J. H. REISNER 2,976,457
ELECTRON LENS
Filed Nov. 2, 1953 3 Sheets-Sheet 2

INVENTOR.
JOHN H. REISNER
BY
ATTORNEY

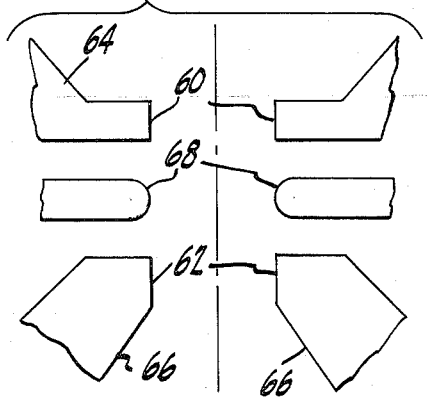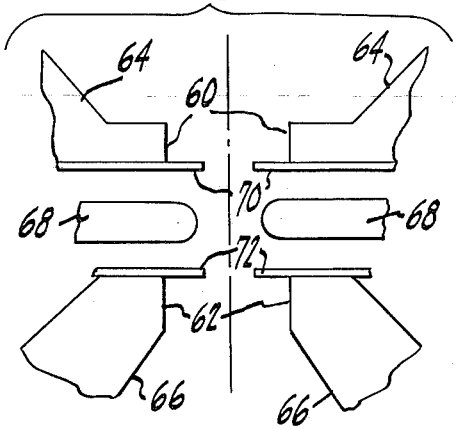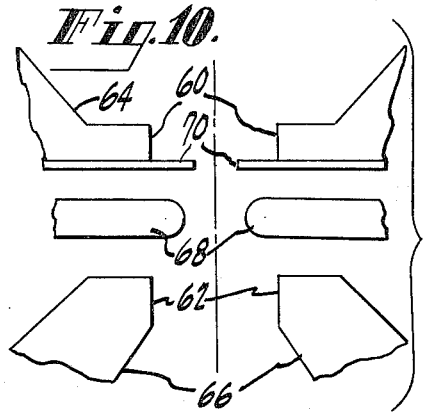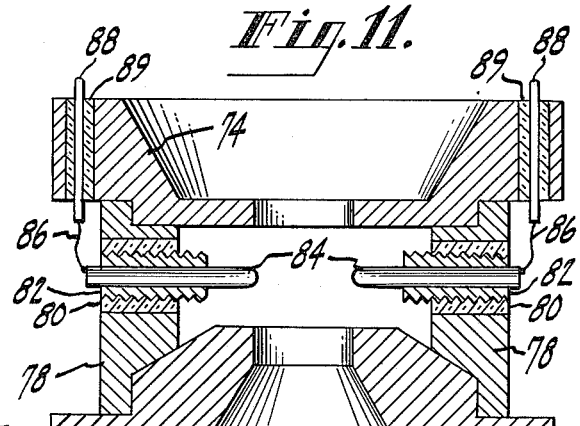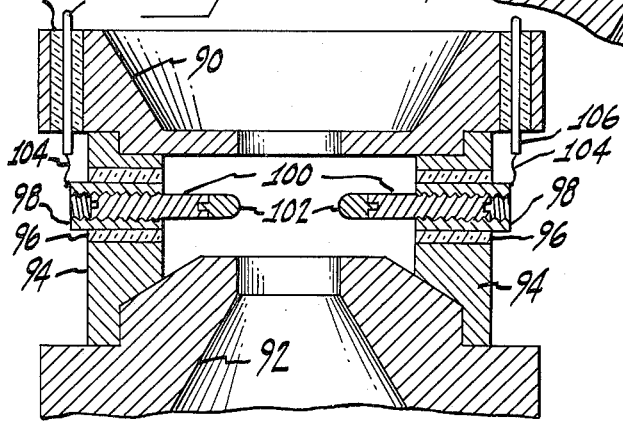

United States Patent Office 2,976,457
Patented Mar. 21, 1961

2,976,457
ELECTRON LENS
John H. Reisner, Haddonfield, N.J., assignor to Radio Corporation of America, a corporation of Delaware
Filed Nov. 2, 1953, Ser. No. 389,625
3 Claims. (Cl. 315—31)

This invention relates to electron optical apparatus and, more particularly, to lens compensating means for such apparatus as electron microscopes and electron deflection cameras.

In electron optical apparatus such as an electron microscope, a beam of electrons is formed at an electron gun and is projected to a target positioned some distance from the gun. The electron beam is controlled and focused in its path by means of magnetic electron lenses. Each of these lenses comprise a pair of pole pieces and an energizing coil. The pole pieces define a magnetic field through which the electrons of the beam must pass in order to reach the target. As is well known in the art, when the electrons pass through a magnetic field their path is altered by an amount which is a function of the velocity of the electrons and the strength of the magnetic field defined by the lens. If a beam of electrons is passed through a lens which is symmetrical with respect to the central axis of the beam and of the lens, the effect on the beam will be symmetrical. A lack of uniformity in the effect on the beam will cause the image of the beam which impinges on the target to be distorted in accordance with the lack of uniformity. Asymmetries in the lens field are caused largely by the anisotropy of the magnetic material from which the pole pieces are made and by mechanical maladjustments. The asymmetry of such pole pieces results in an image aberration which is termed anisotropic astigmatism. The astigmatism of such a lens field is a quantity which is characterized by both direction and magnitude.

A means for correcting field asymmetries in a magnetic lens is described in U.S. Patent No. 2,455,676, issued to Hillier on December 7, 1948. In accordance with the teachings of that patent, a plurality of ferromagnetic members are arranged about the axis of the lens and these members are adjustable to increase or decrease the quantity of iron adjacent the lens field. By careful adjustment of these ferromagnetic members, field asymmetries could be corrected. However, the compensation accomplished by means of these ferromagnetic members is effective at only one field strength of the pole pieces, and hence the strength of the lens cannot be changed without requiring that the compensation means be further adjusted. That is, without further adjustment, the lens cannot be used at more than one electron energy level in an electron microscope. Further, the adjustment must be carried out in the vacuum in which the lens must operate. A plurality of such mechanical adjustments is extremely difficult to carry out during an observation. A further feature is that such mechanical adjustment must be accomplished in terms of rectangular coordinates while astigmatism is most directly expressed in polar coordinates, that is, a direction and a magnitude.

It is, therefore, an object of the present invention to provide an improved means for compensating for asymmetries of magnetic electron lenses.

It is another object of this invention to provide means as set forth characterized in that adjustments are made electrostatically.

It is a further object of this invention to provide lens compensating means as set forth wherein adjustments of the compensating means may be accomplished readily during an operation of the electron optical apparatus.

It is a further object of this invention to provide magnetic lens compensating means as set forth wherein the compensating adjustments are carried out in accordance with polar coordinate dimensions.

In accomplishing these and other objects, there has been provided, in accordance with the present invention, a magnetic lens for a beam of electrons wherein the lens field is defined by a pair of spaced pole pieces. A plurality of compensating rods or electrodes are arranged in radial array about the axis of the lens and positioned between the two pole pieces. These rods are connected to a voltage source in such a manner that an electrostatic field may be superimposed upon the magnetic lens field to provide a compensation for asymmetries in the magnetic field. Such an arrangement may be readily adjusted by changing of the magnitude and distribution of the voltages applied to the several compensating rod members.

Figure 2:
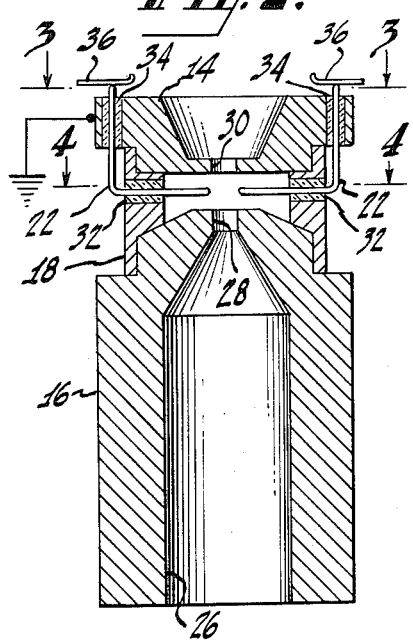
Figure 3:
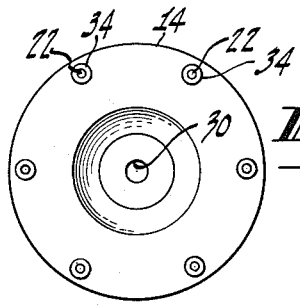
Figure 4:
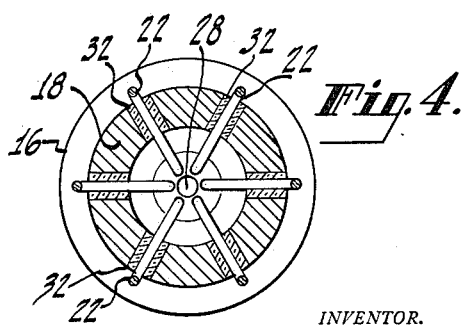
Figure 5:
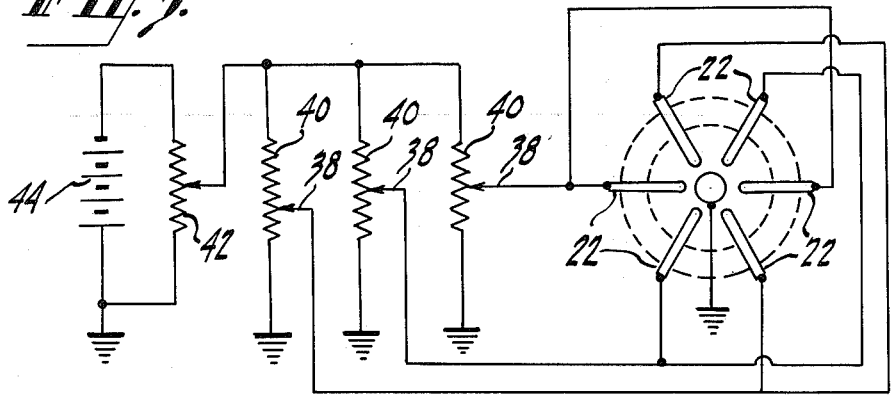
Figure 6:
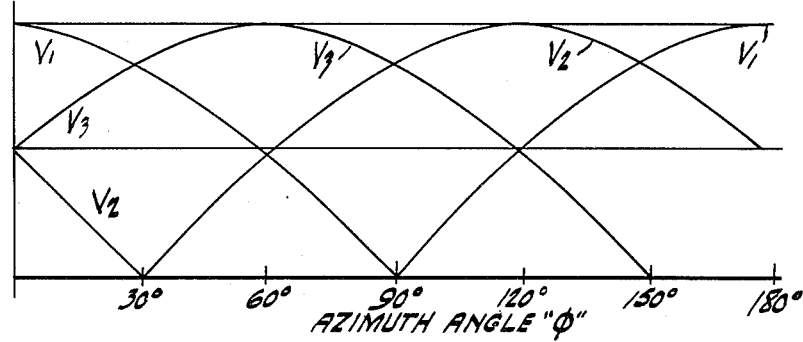
Figure 7:
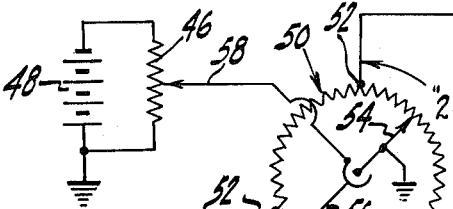

A better understanding of the present invention may be had from the following detailed description when read in connection with the accompanying drawing in which:

Figure 1 is a schematic representation of a cross-sectional, elevational view of an electron microscope embodying the present invention, Figure 2 is an enlarged view of the magnetic structure including the pole pieces of an electron lens and embodying the present invention, Figure 3 is a plan view taken along the line 3—3 of Figure 2 and looking in the direction of the appended arrows, Figure 4 is a cross-sectional plan view taken along the line 4—4 of Figure 2 and looking in the direction of the appended arrows, Figure 5 is a schematic representation of a circuit diagram by which the compensating means may be energized, Figure 6 is a graphical representation of the ratio of voltages applied to the several compensating rods whereby the compensating field is achieved, Figure 7 is a schematic representation of a circuit by which the compensating rods may be energized in accordance with the diagram shown in Figure 6, Figures 8, 9 and 10 are schematic views on a large scale of the pole pieces showing details of the structure of a lens constructed in accordance with the present invention and, Figures 11 and 12 are cross-sectional views of a somewhat different structure embodying the present invention.

Referring now to the drawing in more detail, in Figure 1, the representation of an electron microscope includes an evacuable chamber 2 enclosed in the microscope column structure 4. An electron gun 6 is positioned at one end of the cylindrical column 4. A beam of electrons generated at the electron gun is directed toward a target 8 placed adjacent the opposite end of the column 4. Intermediate the gun and the target, there is positioned a magnetic lens 10 which focusses the electron beam on the target. An object stage 12 is positioned adjacent the lens between the lens and the gun. As is well known in the art, the object stage 12 includes suitable means, not shown, for holding a specimen which is to be subjected to examination in the microscope. The lens comprises an upper pole piece member 14 and lower pole piece member 16 separated by a non-magnetic spacer 18. Surrounding the pole pieces, in energizing relation thereto, is a field coil 20 which is supported in the column 4.

Inserted through the non-magnetic spacer 18 between the poles pieces 14 and 16 is a plurality of electrically conductive, non-magnetic rods or electrodes 22. Suitable circuit means 24 is provided for electrostatically energizing these electrodes.

The structure may be more clearly seen with reference to Figures 2, 3 and 4. In Figure 2, the lens structure 10 is shown wherein the lower pole piece 16 comprises a substantially cylindrical member made of suitable magnetizable material. A central bore passes substantially through the pole piece tapering up toward a central aperture at the upper, field defining end of the pole piece 16. Supported in spaced relation to the lower pole piece 16 is an upper pole piece 14 similarly constructed of magnetizable material, and a similar aperture 30 is provided through the upper pole piece. The two apertures are supported in coaxial relation by means of a non-magnetic spacer 18 which may, for example, be made of brass.

When properly energized by a magnetic field coil such as that represented in Figure 1, a magnetic field will be established between the two pole pieces in such a manner as to constitute a substantially spherical lens. However, as previously indicated, due largely to the anisotropic nature of the iron from which the pole pieces are made and mechanical maladjustment, the lens formed will not necessarily be truly spherical but may have a cylindrical component producing an astigmatic aberration in the formed image.

To overcome such asymmetry, the plurality of the compensating electrostatic rods or electrodes 22 are placed in a position to be effective in superimposing an electrostatic field upon the magnetic field. One way of positioning these rods 22 in the space between the pole pieces is to provide insulating bushings 32 through the non-magnetic spacer. These bushings 32 having a central bore through which the rods 22 are fitted as shown in Figures 2, 3 and 4, the rods, six being selected as an effective number, are substantially L-shaped with one leg of the L passing through the bushings 32 in the pole piece spacer 18 and into the space between the pole pieces. The other legs of the L's pass through corresponding insulating bushings 34 in the upper pole piece where they may be engaged by suitable electrical contact members 36.

Referring now to Figure 5, the circuit schematically shown includes means for applying voltages to the several electrodes in such a manner that the field produced by the electrodes is representative of a quantity defined in terms of polar coordinates. That is, a direction and a magnitude. The six electrodes 22 are positioned in a symmetrical radial array about the axis of the lens. Diametrically opposed ones of the electrodes 22 constitute a pair and are electrically connected together. Each pair of electrodes is connected to a movable arm 38 of a corresponding potentiometer 40 respectively. These three potentiometers 40 are connected in parallel and supplied with a voltage from a fourth potentiometer 42 serially connected with a direct current source 44. With this arrangement, the magnitude of the voltage applied to the system is determined by the setting of the fourth potentiometer 42. The distribution of the applied voltages among the three pairs of electrodes is determined by the relative setting of the first three potentiometers 40 which constitute a voltage distributor. The variations in the setting of the distributor will determine the direction of the magnetic field set up by the electrodes 22.

In order for the field established by the electrodes to be rotated with a uniform circular pattern, the ratios of the voltages applied to the three pairs of electrodes should be distributed as indicated in the graph of Figure 6 where $V_1$, $V_2$ and $V_3$ represent the voltages applied to the three pairs of electrodes. In other words, to permit the magnitude of the electrostatic field to be determined by the fourth potentiometer, irrespective of the direction of the field, the ratios of the voltages applied to the several pairs of electrodes must be such that the effective resultant voltage is constant. Such an arrangement, although possible with apparatus of the type represented in Figure 5, may be more readily carried out by apparatus of the type shown in Figure 7. In this figure, the magnitude determining potentiometer 46 is substantially the same as that shown in Figure 5, being connected serially with a source of direct current 48. The direction determining potentiometer 50 comprises a three-part, continuous, circular, potentiometer with the three pairs of electrodes 22 connected to three equally spaced taps 52. A pair of sliders are mounted to be pivoted about the center of the circular potentiometers. The two sliders being diametrically oppositely directed. One of the sliders 54 is connected to ground. The other slider 56 is connected to the movable arm 58 of the magnitude determining potentiometer 46. The direction determining potentiometer 50 is of the type which may be referred to as a sine potentiometer. The direction of the field produced as a result of the distribution of potential on the electrodes bears a fixed ratio with the position of the slide members of the potentiometer. Thus, for a field whose direction varies from a fixed reference direction by an angle $\phi$, the ungrounded slider 56 defines an angle $2\phi$ with a corresponding fixed reference position. It may be seen that with such a potentiometer arrangement as is shown in Figure 7, one potentiometer 46 determines the magnitude of the field applied while the other potentiometer 50 determines the direction of that applied field. These applied fields constitute substantially, in effect, cylindrical lenses for the stream of electrons. When such a static field is properly adjusted in magnitude and direction, the asymmetry of the magnetic lens may be corrected.

By placing the electrostatic correcting means between the pole pieces so that the electrostatic correcting field is superimposed directly upon the main magnetic lens field, the result is substantially analogous to that of optical lens which has been properly ground to correct an astigmatic condition. This differs substantially from what has been found in the prior art wherein a correcting field has been imposed upon the stream of electrons subsequent to the passage of the electron beams through the main lens field. This latter arrangement is somewhat analogous to a light optical instrument in which the distortion introduced by a faulty lens is corrected by a subsequent lens. By correcting the aberration in the main lens field in accordance with the present invention, a minimum voltage is required to establish a proper correcting field.

In Figures 8, 9 and 10, there are shown various arrangements of the structure of the pole pieces and the compensating members in the immediate vicinity of the lens field. In Figure 8, the simplest structure is shown in which the central apertures 60, 62 through the pole pieces 64, 66 constitutes the diaphragm opening. The compensating electrodes 68 must be drawn to a position to be no nearer the axis of the lens than the rim of the aperture. In Figure 9, additional diaphragm plates 70, 72 are positioned to reduce the lens aperture. This arrangement has the effect of protecting the ends of the compensating electrodes 68 from bombardment by electrons in the main electron beam while permitting the electrodes to be more effectively placed closer to the lens axis. Such bombardment may have a deleterious effect on the structure of the rods 68. Furthermore, in Figure 8, the magnetic pole pieces are at ground potential constituting outside electrodes. While in Figure 9, the ground electrode is extended toward the axis of the lens by the diaphragms or the aperture plates to permit a stronger lens than otherwise possible with the large bore of the magnetic pole pieces. The cylindrical lenses that are thus produced are positive (convergent) lenses and may be excited by either positive or negative voltages applied to the compensating rods 68. The cylindrical lenses may also be non-symmetrical about the plane of the compensating rods. If the lower aperture plate or diaphragm is omitted, as shown in Figure 10, leaving only the upper diaphragm 70 the lens will be convergent with a negative voltage applied to the rod members and can be made divergent when a positive voltage is used. The arrangement shown in Figure 10 also provides for the shielding of the compensating electrodes from the bombardment of the electron stream while permitting the closer positioning of the electrodes.

Referring to Figure 11, there is shown an electron lens structure which has a compound compensating means. There is provided the usual upper and lower pole pieces 74 and 76 respectively, with a non-magnetic spacing member 78 between them. A plurality of insulating bushings 80 are inserted in openings spaced around the non-magnetic spacer 78. Threaded into these bushings are magnetic shim screws 82 which are substantially in accordance with the teachings of the aforesaid Hillier patent. However, each of these shim screws 82 is provided with a central axial bore into each of which is slidably fitted a non-magnetic electrostatic compensating rod 84. The electrostatic compensating rods 84 are electrically connected through conductors 86 to contact members 88 which are mounted in bushings 89 in the upper pole piece 74. This type of arrangement takes advantage of the magnetic as well as the electrostatic compensation. The main magnetic lens is operated in the usual manner and the asymmetries determined. The magnetic compensating shim screws 82 are then adjusted to give an initial compensation. The machine may then be placed in operation and the fine adjustment accomplished by means of the electrostatic compensating fields. A further advantage of this type of structure lies in the fact that an initial adjustment may be made for one electron energy level by means of the magnetic and electrostatic compensating fields. Then, without the necessity of disturbing the vacuum or taking the machine out of operation, the microscope may be operated at a different electron energy level with the variation in the required amount of compensation being accomplished electrically by means of the electrostatic compensating members 84.

In Figure 12, a further structure is shown which also embodies the present invention. Here again, the principal lens structure includes an upper pole piece 90 and a lower pole piece 92 with a non-magnetic spacer 94 therebetween. A plurality of insulating bushings 96 are fitted into suitable openings about the periphery of the non-magnetic spacer 94. Fitted into these bushings is an internally-threaded, metallic, non-magnetic bushing 98. Magnetic adjusting shim screws 100 are threaded to fit the internal threads of the conductive metallic bushings 98. Each of the shim screws is provided with a non-magnetic electrostatic compensating cap 102. The metallic bushings are electrically connected through conductors 104 to contact members 106 which are mounted in bushings 108 in the upper pole piece 90. The electrostatic cap members 102 on the shim screws 100 extend the inner end of the shim screws toward the axis of the lens to be in a position to provide effective compensation.

In compensating for asymmetries of the magnetic lens by means of the magnetic shim screws 100, the screws are adjusted to effectively place more or less iron in the vicinity lens field. The compensation achieved by a forward or rearward adjustment of the magnetic shim screw 100 is in the same direction as would be accomplished if the electrostatic compensating members 102 were similarly adjusted without a change in the voltage applied to the electrostatic compensating means 102. Thus, an initial compensation may be achieved by adjustment of the magnetic shim screws; then, with the machine in operation, voltage may be applied to the electrostatic means to bring about a final adjustment of the lens. It may be noted that with the variations in radial spacing of the electrostatic means, the same voltage may be applied to all the electrostatic compensating elements. The field and the direction thereof will be determined by the relative radial spacing.

Thus, it may be seen that there has been provided in accordance with the present invention an improved means for compensating for asymmetries in magnetic electron lenses wherein the compensation may be accomplished while the apparatus is in operation, compensation may be carried out electrostatically.

What is claimed is:

1. In electron optical apparatus including means for forming a beam of electrons, a lens for controlling said beam, said lens having an axis and comprising a pair of pole pieces supported adjacent each other in axially spaced relation, means for magnetically energizing said pole pieces to establish a lens field therebetween, means for correcting asymmetries of said lens field, said correcting means including a plurality of magnetic shim screws symmetrically spaced in radial array about said lens axis and between said pole pieces, a corresponding number of similarly arrayed electrostatic probe electrodes, said electrodes and shim screws being mechanically adjustable with respect to each other, and means for selectively energizing said electrodes.

2. The invention as set forth in claim 1 wherein said magnetic shim screws are provided with an axial bore and said electrodes extend through said bore into the space between said pole pieces adjacent said lens field.

3. The invention as set forth in claim 1 wherein said electrodes comprise non-magnetic, metallic cap members secured to the ends of said shim screws.

References Cited in the file of this patent

UNITED STATES PATENTS

| | | |
|---|---|---|
| 2,119,795 | Ruska et al. | June 7, 1938 |
| 2,354,287 | Zworykin et al. | July 25, 1944 |
| 2,443,107 | Hillier | June 8, 1948 |
| 2,455,676 | Hillier | Dec. 7, 1948 |
| 2,486,856 | Liebmann | Nov. 1, 1949 |
| 2,547,994 | Bertein | Apr. 10, 1951 |
| 2,555,850 | Glyptis | June 5, 1951 |
| 2,580,675 | Grivet et al. | Jan. 1, 1952 |

FOREIGN PATENTS

| | | |
|---|---|---|
| 936,762 | France | Feb. 23, 1948 |